US012781932B2

(12) United States Patent
Mori et al.

(10) Patent No.: US 12,781,932 B2
(45) Date of Patent: Nov. 3, 2026

(54) LIGHT EMITTING MODULE, VEHICLE LIGHTING DEVICE, AND VEHICLE LAMP

(71) Applicant: Toshiba Lighting & Technology Corporation, Kanagawa (JP)

(72) Inventors: Hiraku Mori, Ehime-ken (JP); Daisuke Kosugi, Ehime-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 19 days.

(21) Appl. No.: 19/019,329

(22) Filed: Jan. 13, 2025

(65) Prior Publication Data

US 2026/0063261 A1 Mar. 5, 2026

(30) Foreign Application Priority Data

Aug. 27, 2024 (JP) ................................ 2024-145741

(51) Int. Cl.
*H05B 45/30* (2020.01)
*F21S 41/143* (2018.01)
*F21S 41/19* (2018.01)

(52) U.S. Cl.
CPC ............ *F21S 41/143* (2018.01); *F21S 41/19* (2018.01)

(58) Field of Classification Search
CPC ............................... F21S 41/143; F21S 41/19
See application file for complete search history.

(56) References Cited

U.S. PATENT DOCUMENTS 4,691,263 A * 9/1987 Kenny ................ H03K 17/785 361/101
7,382,241 B1 * 6/2008 Huang .................... B60Q 1/38 340/475
11,821,603 B1 11/2023 Matsuo
2012/0319612 A1 12/2012 Weil et al.

FOREIGN PATENT DOCUMENTS

JP H06348350 12/1994
JP 2003037933 2/2003
JP 2004009825 A * 1/2004 ............ H05B 45/58
JP 2013021883 1/2013

OTHER PUBLICATIONS

MPS, "Designing a Reverse Polarity Protection Circuit (Part I)", retrieved on Jul. 7, 2025, pp. 1-4. Retrieved from: https://media.monolithicpower.com/mps_cms_document/2/0/2022-en-wechat-designing-a-reverse-polarity-protection-circuit_part-i_r1.0.pdf?_gl=1*h9awuv*_ga*MjA4MTg2NzQzMy4xNzUxODkxNjM2*_ga_XNRPF6L9DD*czE3NTE4OTQ0MDgkbzlkZzEkdDE3NTE4OTQ3OTckajYwJGwwJGgw*_gcl_au*MTAwMTM5NDg2MC4xNzUxODkxNjM2&_ga=2.207369367.

* cited by examiner

*Primary Examiner* — Henry Luong
(74) *Attorney, Agent, or Firm* — JCIPRNET

(57) ABSTRACT

A light emitting module, a vehicle lighting device, and a vehicle lamp are capable of achieving protection of a light emitting element against a negative surge, suppression of a voltage drop, and miniaturization. The light emitting module includes: at least one light emitting element; a field effect transistor electrically connected between an anode side and a cathode side of the light emitting element and a DC power supply; and a varistor connected in parallel with the field effect transistor.

9 Claims, 3 Drawing Sheets

LIGHT EMITTING MODULE, VEHICLE LIGHTING DEVICE, AND VEHICLE LAMP

CROSS-REFERENCE TO RELATED APPLICATION

This application claims the priority benefit of Japan application serial no. 2024-145741, filed on Aug. 27, 2024. The entirety of the above-mentioned patent application is hereby incorporated by reference herein and made a part of this specification.

BACKGROUND

Technical Field

Embodiments of the disclosure relate to a light emitting module, a vehicle lighting device, and a vehicle lamp.

Related Art

From the viewpoint of energy conservation and lifespan extension, in place of lamps with filaments, light emitting modules including light emitting elements such as light emitting diodes are becoming increasingly widespread.

Herein, there may be cases where a negative surge such as a reverse direction voltage or a pulse noise from a reverse direction is applied to the light emitting module. Upon application of a negative surge to the light emitting element, there is a risk that the light emitting element may fail. Thus, to protect the light emitting element from a negative surge, a diode is connected in series on an anode side of the light emitting element.

In this case, upon connecting multiple light emitting elements in series to achieve a high luminous flux, as a diode is further connected in series with the multiple light emitting elements connected in series, a voltage drop becomes large. Upon an increase of the voltage drop, there is a risk that a desired total luminous flux may not be obtained.

Thus, a technique has been proposed to protect the light emitting element against a negative surge using a field effect transistor. By using a field effect transistor, the voltage drop can be reduced. However, a field effect transistor having a high withstand voltage against a reverse direction voltage becomes large in size. Thus, it becomes difficult to achieve miniaturization of the light emitting module by simply using a field effect transistor.

Thus, there has been a demand for development of a technique capable of achieving protection of a light emitting element against a negative surge, suppression of a voltage drop, and miniaturization.

RELATED ART DOCUMENTS

Patent Documents

[Patent Document 1] Japanese Patent Application Laid-Open No. 2013-21883

SUMMARY

A light emitting module according to an embodiment includes: at least one light emitting element; a field effect transistor electrically connected between an anode side and a cathode side of the light emitting element and a DC power supply; and a varistor connected in parallel with the field effect transistor.

According to an embodiment of the disclosure, a light emitting module, a vehicle lighting device, and a vehicle lamp capable of achieving protection of a light emitting element against a negative surge, suppression of a voltage drop, and miniaturization can be provided.

DESCRIPTION OF THE EMBODIMENTS

Embodiments of the disclosure provide a light emitting module, a vehicle lighting device, and a vehicle lamp capable of achieving protection of a light emitting element against a negative surge, suppression of a voltage drop, and miniaturization.

Hereinafter, embodiments will be illustrated with reference to the drawings. In each drawing, same constituent elements will be labeled with same reference signs, and detailed descriptions thereof will be omitted as appropriate.

(Light Emitting Module and Vehicle Lighting Device)

A light emitting module according to the present embodiment may be provided in, for example, a vehicle lighting device. However, the use of the light emitting module is not limited to a vehicle lighting device. Hereinafter, as an example, a case where the light emitting module is provided in a vehicle lighting device will be described.

A vehicle lighting device 1 may be provided in, for example, an automobile, a railway vehicle, etc. Examples of the vehicle lighting device 1 provided in an automobile include, for example, those used in a front combination light (e.g., an appropriate combination of a daytime running lamp (DRL), a position lamp, a turn signal lamp, etc.) and a rear combination light (e.g., an appropriate combination of a stop lamp, a tail lamp, a turn signal lamp, a back lamp, a fog lamp, etc.). However, the use of the vehicle lighting device 1 is not limited thereto.

Figure 1:
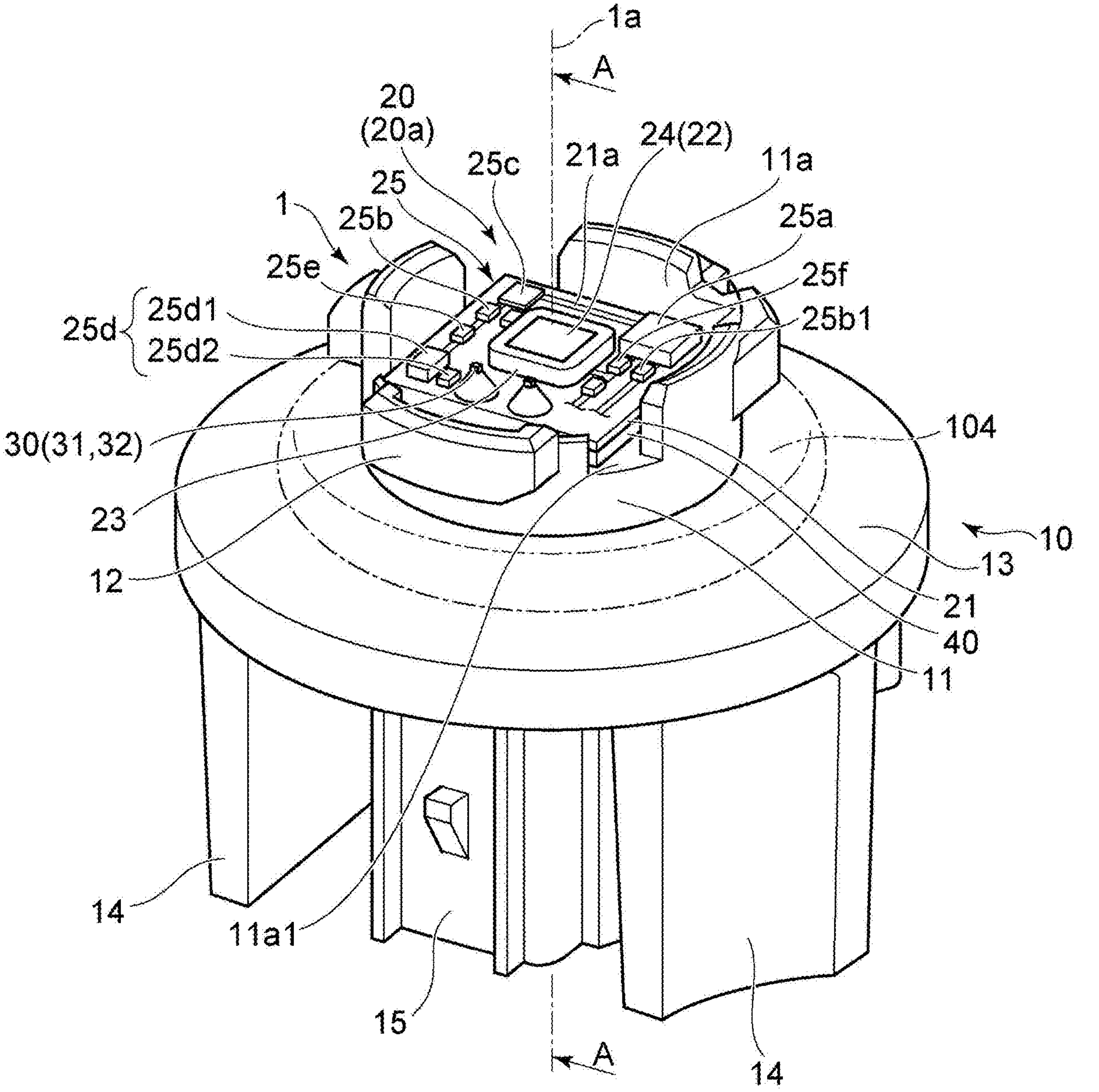
FIG. 1 is a schematic perspective view for illustrating a vehicle lighting device according to the present embodiment.
Figure 2:
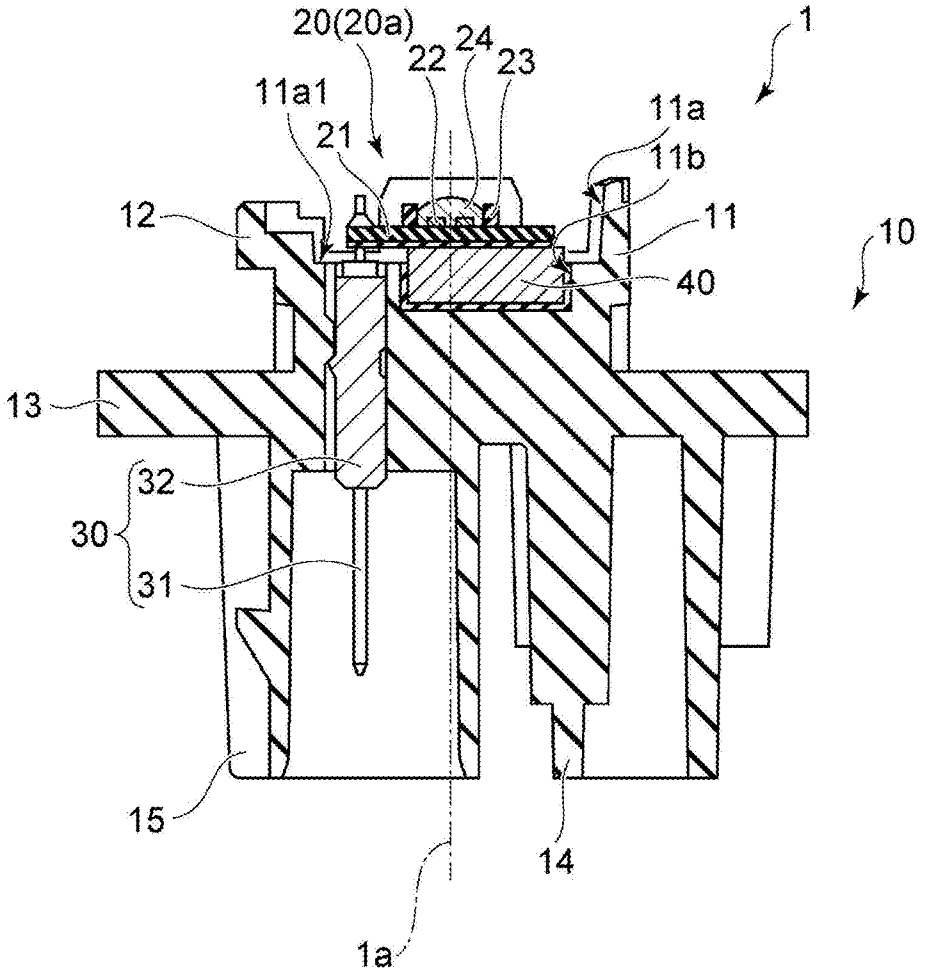
FIG. 2 is a cross-sectional view taken along a line A-A of the vehicle lighting device in FIG. 1.

FIG. 1 is a schematic perspective view for illustrating the vehicle lighting device 1 according to the present embodiment. FIG. 2 is a cross-sectional view along a line A-A of the vehicle lighting device 1 in FIG. 1. As shown in FIG. 1 and FIG. 2, the vehicle lighting device 1 is provided with, for example, a socket 10, a light emitting module 20, a power supply part 30, and a heat transfer part 40.

The socket 10 includes, for example, a mounting part 11, a bayonet 12, a flange 13, a heat dissipation fin 14, and a connector holder 15.

The mounting part 11 is provided on a surface of the flange 13 opposite to a side on which the heat dissipation fin 14 is provided. An outer shape of the mounting part 11 is, for example, a cylindrical shape. The mounting part 11 has, for example, a recess 11*a* that is opened at an end opposite to the flange 13 side.

The bayonet 12 is provided on, for example, a lateral surface of the mounting part 11. The bayonet 12 protrudes toward an outer side of the vehicle lighting device 1. The bayonet 12 is opposed to the flange 13. Multiple bayonets 12 may be provided. The bayonet 12 is used, for example, when mounting the vehicle lighting device 1 to a housing 101 of a vehicle lamp 100 to be described later. The bayonet 12 may be used as a twist lock.

The flange 13 is in, for example, a substantially disk shape. A lateral surface of the flange 13 is located on a more outward side of the vehicle lighting device 1 than a lateral surface of the bayonet 12.

The heat dissipation fin 14 is provided on a side of the flange 13 opposite to the mounting part 11 side. At least one heat dissipation fin 14 may be provided. For example, as shown in FIG. 1, multiple heat dissipation fins 14 may be provided at the socket 10. The multiple heat dissipation fins 14 may be arranged in a predetermined direction. The heat dissipation fin 14 is in, for example, a plate shape or a tubular shape.

The connector holder 15 is provided on a side of the flange 13 opposite to the mounting part 11 side. The connector holder 15 may be provided in an arrangement with the heat dissipation fin 14. The connector holder 15 is in a tubular shape, and a connector 105 having a seal member 105*a* is inserted into the connector holder 15.

The socket 10 serves a function of holding the light emitting module 20 and the power supply part 30, and a function of transferring heat generated in the light emitting module 20 to outside. Thus, the socket 10 may be formed from a material with high thermal conductivity. The socket 10 may be formed from, for example, metal such as aluminum alloy.

In addition, in recent years, there has been a demand for weight reduction of the vehicle lighting device 1, and thus weight reduction of the socket 10. Therefore, the socket 10 may also be formed from, for example, a high thermal conductivity resin. The high thermal conductivity resin is, for example, a mixture of a resin such as polyethylene terephthalate (PET) or nylon with a filler using carbon or aluminum oxide. By configuring a socket 10 including a high thermal conductivity resin, heat generated in the light emitting module 20 can be efficiently dissipated. In addition, the weight of the socket 10 can be reduced.

The power supply part 30 includes, for example, multiple power supply terminals 31 and a holding part 32. One-end parts of the multiple power supply terminals 31 protrude from a bottom surface 11*a*1 of the recess 11*a*. The one-end parts of the multiple power supply terminals 31 are soldered with a wiring pattern 21*a* provided at a substrate 21. Other-end parts of the multiple power supply terminals 31 are exposed inside a hole of the connector holder 15. The connector 105 is fitted to the multiple power supply terminals 31 exposed inside the hole of the connector holder 15. The multiple power supply terminals 31 are formed from, for example, metal such as copper alloy. The quantity, shape, arrangement, material, etc. of the multiple power supply terminals 31 are not limited to those illustrated herein and may be appropriately modified.

In the case where the socket 10 is formed using, for example, metal or a high thermal conductivity resin containing a filler using carbon, the socket 10 has conductivity. Thus, the holding part 32 is provided to insulate between the multiple power supply terminals 31 and the socket 10 having conductivity. In the case where the socket 10 is formed using a high thermal conductivity resin having insulating properties (e.g., a high thermal conductivity resin containing a filler using aluminum oxide), the holding part 32 may be omitted. The holding part 32 may be, for example, press-fitted into a hole provided at the socket 10 or adhered to an inner wall of the hole.

The heat transfer part 40 is provided between the socket 10 and the light emitting module 20 (substrate 21). As shown in FIG. 2, the heat transfer part 40 is provided, for example, inside a recess 11*b* that is opened at the bottom surface 11*a*1 of the recess 11*a*. For example, the heat transfer part 40 may be adhered to an inner wall of the recess 11*b*, attached inside the recess 11*b* via a thermal conductive grease (heat dissipation grease), or embedded inside the recess 11*b* by insert molding. The heat transfer part 40 may be formed from, for example, metal such as aluminum, aluminum alloy, copper, copper alloy, etc. In the case where the socket 10 is formed from metal or the heat generated in the light emitting module 20 is little, the heat transfer part 40 may be omitted.

The light emitting module 20 includes, for example, a substrate 21, a light emitting element 22, a frame part 23, a sealing part 24, and a circuit element 25.

The substrate 21 is provided on one end side of the socket 10. The substrate 21 may be, for example, adhered onto the heat transfer part 40. In the case where the heat transfer part 40 is omitted, the substrate 21 is adhered to, for example, the bottom surface 11*a*1 of the recess 11*a*. An adhesive for adhering the substrate 21 may have a high thermal conductivity. For example, the adhesive may be an adhesive mixed with a filler using a conductive material or an inorganic material.

The substrate 21 may be formed from, for example, an inorganic material such as ceramics (e.g., aluminum oxide or aluminum nitride), an organic material such as paper phenol or glass epoxy, etc. In addition, the substrate 21 may be a metal core substrate with a surface of a metal plate covered with an insulating material. In addition, the substrate 21 may have a one-layer structure or may have a multi-layer structure.

In addition, the wiring pattern 21*a* is provided on a surface of the substrate 21. The wiring pattern 21*a* is formed from, for example, a material with silver as a main component or a material with copper as a main component.

In addition, a covering part may be provided to cover the wiring pattern 21*a*, a film-shaped resistor (to be described later), etc. The covering part may include, for example, a glass material.

The light emitting element 22 is provided on the substrate 21 (on a surface of the substrate 21 on a side opposite to the socket 10 side). The light emitting element 22 is electrically connected to the wiring pattern 21*a*. At least one light emitting element 22 may be provided. In the case of providing multiple light emitting elements 22, the multiple light emitting elements 22 may be connected in series.

The light emitting element 22 may be, for example, a light emitting diode, an organic light emitting diode, a laser diode, etc.

The light emitting element 22 may be any of a chip-shaped light emitting element, a surface mount type light emitting element such as a plastic leaded chip carrier (PLCC) type, and a light emitting element having a lead wire such as a shell type. However, with the light emitting element 22 being a chip-shaped light emitting element, it is possible to achieve miniaturization of the light emitting module 20, and thus miniaturization of the vehicle lighting device 1.

Thus, hereinafter, as an example, a case where the light emitting element 22 is a chip-shaped light emitting element will be described. The chip-shaped light emitting element 22 may be electrically connected to the wiring pattern 21*a* by chip on board (COB). The chip-shaped light emitting element 22 may be any of an upper electrode type light emitting element, an upper and lower electrode type light emitting element, and a flip-chip type light emitting element.

The frame part 23 is in a frame shape and surrounds the light emitting element 22. The frame part 23 may be adhered onto the substrate 21 using an adhesive. A contour (contour of a planar shape) of the frame part 23 as viewed from a direction along a central axis 1*a* of the vehicle lighting device 1 may be appropriately changed according to required light distribution properties and luminance distribution. For example, the contour of the planar shape of the frame part 23 illustrated in FIG. 1 is a substantially rectangular shape.

The sealing part 24 is provided on an inner side of the frame part 23. The sealing part 24 is provided to cover a region surrounded by the frame part 23. The sealing part 24 is provided to cover the light emitting element 22. The sealing part 24 includes a resin having light-transmitting properties. The resin is, for example, silicone resin. In addition, the sealing part 24 may include a phosphor.

In the case where the light emitting element 22 is a surface mount type light emitting element or a light emitting element having a lead wire such as a shell type, the frame part 23 and the sealing part 24 may be omitted.

The circuit element 25 may be a passive element or an active element used to constitute a light emitting circuit 20*a* having the light emitting element 22. The circuit element 25 is provided on the substrate 21. The circuit element 25 is, for example, provided around the frame part 23 and is electrically connected to the wiring pattern 21*a*.

Figure 3:
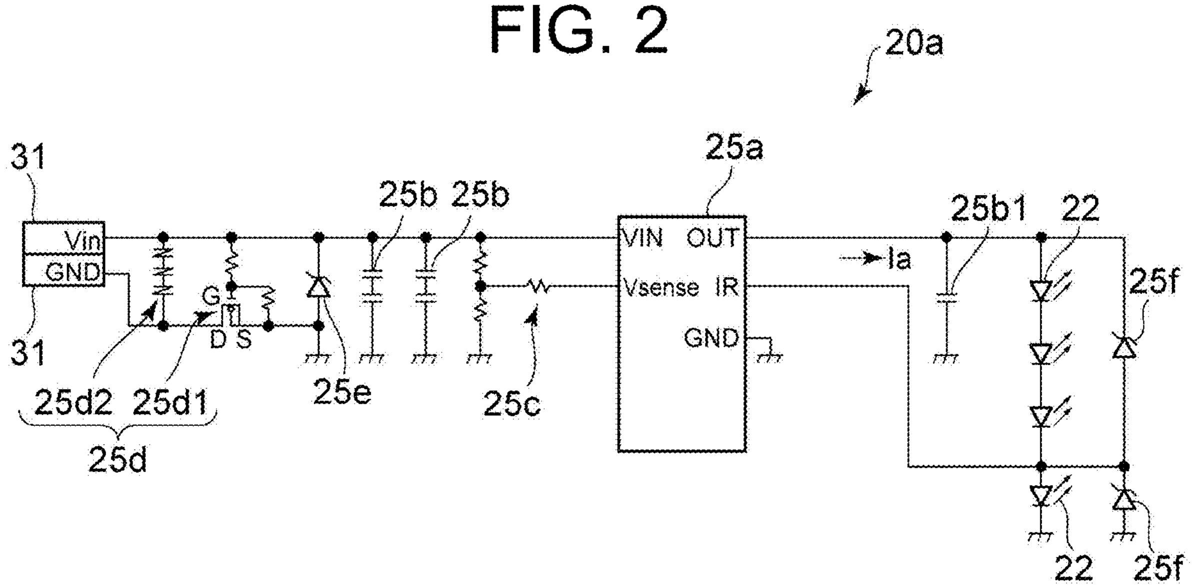
FIG. 3 is a circuit diagram for illustrating a light emitting circuit.

FIG. 3 is a circuit diagram for illustrating the light emitting circuit 20*a*. As shown in FIG. 3, the light emitting circuit 20*a* includes, for example, the light emitting element 22 and the circuit element 25.

The circuit element 25 may include, for example, a control element 25*a*, a capacitor 25*b*, a resistor 25*c*, a first protective element 25*d*, and a second protective element 25*e*. However, the circuit element 25 is not limited to the elements illustrated herein. In addition to the elements described above, the circuit element 25 may also be, for example, a positive temperature coefficient thermistor, a negative temperature coefficient thermistor, an inductor, a surge absorber, a transistor, an integrated circuit, an arithmetic element, etc.

The control element 25*a* may be electrically connected, for example, between the first protective element 25*d* and an anode side of multiple light emitting elements 22 connected in series. The control element 25*a*, for example, switches a quantity of the light emitting elements 22 to be illuminated according to a voltage applied to the vehicle lighting device 1 (light emitting module 20). The control element 25*a* may be, for example, an integrated circuit capable of executing total luminous flux control by switching the quantity of the light emitting elements 22 to be illuminated.

For example, the first protective element 25*d* and the second protective element 25*e* are electrically connected to a VIN terminal of the control element 25*a*. The multiple light emitting elements 22 connected in series are electrically connected to, for example, an OUT terminal of the control element 25*a*. In this case, the anode side of the light emitting elements 22 is electrically connected to the OUT terminal. A cathode side of the light emitting elements 22 is electrically connected to a ground of the vehicle such as a chassis of a vehicle body. In the case of the light emitting circuit 20*a* illustrated in FIG. 3, four light emitting elements 22 connected in series are electrically connected to the OUT terminal of the control element 25*a*.

A part of the multiple light emitting elements 22 connected in series is electrically connected to, for example, an IR terminal of the control element 25*a*. In the case of the light emitting circuit 20*a* illustrated in FIG. 3, one light emitting element 22 among the four light emitting elements 22 connected in series is electrically connected to the IR terminal of the control element 25*a*. A GND terminal is, for example, electrically connected to a source electrode S of a field effect transistor 25*d*1.

Upon decrease of the voltage applied to the vehicle lighting device 1, a total luminous flux of light emitted from the vehicle lighting device 1 may decrease, and there is a risk that the total luminous flux may become equal to or less than a specified value. The control element 25*a* switches the quantity of the light emitting elements 22 to be illuminated according to the voltage applied to the vehicle lighting device 1.

For example, in the case where the voltage applied to the vehicle lighting device 1 is high (e.g., in the case of a rated voltage of about 13.5 V), the control element 25*a* flows an output current Ia to all of the multiple light emitting elements 22 connected in series via the OUT terminal. In this case, light is emitted from all the light emitting elements 22. In the case of the light emitting circuit 20*a* illustrated in FIG. 3, the output current Ia is flowed to all of the four light emitting elements 22 connected in series.

For example, in the case where the voltage applied to the vehicle lighting device 1 becomes low (e.g., in the case of about 6 V), the control element 25*a* flows the output current Ia to the light emitting elements 22 electrically connected between the OUT terminal and the IR terminal. If the quantity of the light emitting elements 22 to be illuminated decreases, a voltage drop can be reduced. Thus, even if the voltage applied to the vehicle lighting device 1 becomes low and the output current Ia decreases, a decrease of the total luminous flux to be equal to or less than the specified value can be suppressed.

In addition, depending on an ambient temperature of an environment in which the vehicle lighting device 1 is provided, when the vehicle lighting device 1 is illuminated, the temperature of the light emitting elements 22 may become excessively high, and there is a risk that the temperature of the light emitting elements 22 may exceed a maximum junction temperature. If the temperature of the light emitting elements 22 exceeds the maximum junction temperature, there is a risk that the light emitting elements may fail or the function of the light emitting elements 22 may deteriorate.

Thus, the control element 25*a* may be configured to be capable of executing temperature derating. For example, at least one of a positive temperature coefficient thermistor and a negative temperature coefficient thermistor may be provided at the substrate 21, and the control element 25*a* may be configured to execute temperature derating based on a change in a resistance value of the thermistor. In addition, the control element 25*a* may also be configured to be capable of executing the switching of the quantity of the light emitting elements 22 to be illuminated described above and the temperature derating. In other words, the control element 25*a* may be configured to be capable of executing at least one of the temperature derating and the switching of the quantity of the light emitting elements 22 to be illuminated according to the voltage applied to the vehicle lighting device 1 (light emitting module 20).

The capacitor 25*b* is, for example, connected in parallel with the control element 25*a*. The capacitor 25*b* may be provided, for example, for smoothing the voltage applied to the control element 25*a* or as a noise countermeasure. FIG. 3 illustrates a case where two capacitors 25*b* connected in series are connected in parallel with two capacitors 25*b* connected in series, but the quantity and connection configuration of the capacitors 25*b* may be appropriately changed as needed. In addition, the capacitor 25*b* may also be omitted.

In addition, a capacitor 25*b*1 may also be provided to be connected in parallel with the light emitting element 22. The capacitor 25*b*1 may be provided, for example, for smoothing the voltage applied to the light emitting element 22 or as a noise countermeasure. The quantity and connection configuration of the capacitors 25*bl* may be appropriately changed as needed. In addition, the capacitor 25*bl* may also be omitted.

The resistor 25*c* is electrically connected to a Vsense terminal of the control element 25*a*. The control element 25*a* sets a voltage switching the quantity of the light emitting elements 22 to be illuminated described above, based on a resistance value of the resistor 25*c*. Thus, the resistor 25*c* may also be configured to have an adjustable resistance value. For example, the resistor 25*c* may be a variable resistor or a film-shaped resistor capable of laser trimming.

Herein, due to vibration associated with traveling, a pulse noise (negative voltage pulse) from a reverse direction may be applied to the vehicle lighting device 1 (light emitting circuit 20*a*) by a counter-electromotive force in the circuit provided in the vehicle. In addition, in cases such as incorrect electrical connection with a battery, a reverse direction voltage (negative voltage) may be applied to the vehicle lighting device 1. Upon application of such a negative surge to the control element 25*a* or the light emitting element 22, there is a risk that the vehicle lighting device 1 may fail or the function of the vehicle lighting device 1 may deteriorate.

Thus, the light emitting circuit 20*a* is provided with the first protective element 25*d*. In this case, if a diode is connected between the power supply terminal 31 on a Vin side and the VIN terminal of the control element 25*a*, application of a negative surge to the control element 25*a* and the light emitting element 22 can be suppressed. However, by doing so, since the diode is further connected in series with the multiple light emitting elements 22 connected in series, the voltage drop increases.

As described above, in the case where the voltage applied to the vehicle lighting device 1 becomes low, the control element 25*a* reduces the quantity of the light emitting elements 22 to be illuminated. However, upon an increase of the voltage drop due to series connection of the diode, there is a risk that the total luminous flux may become less than the specified value even if the quantity of the light emitting elements 22 to be illuminated is reduced in an attempt to ensure the total luminous flux.

Thus, the first protective element 25*d* is provided with a field effect transistor (FET) 25*d*1. The field effect transistor 25*d*1 may be electrically connected between the power supply terminal 31 on the Vin side and the VIN terminal of the control element 25*a* via a resistor. In other words, the field effect transistor 25*d*1 is electrically connected between the anode-cathode of the light emitting element 22 and a DC power supply.

In this case, the field effect transistor 25*d*1 may be an n-channel field effect transistor or may be a p-channel field effect transistor. The field effect transistor 25*d*1 illustrated in FIG. 3 is an n-channel field effect transistor.

In the case where the field effect transistor 25*d*1 is an n-channel field effect transistor, as shown in FIG. 3, a gate electrode G is electrically connected between the power supply terminal 31 on the Vin side and the VIN terminal of the control element 25*a*; a drain electrode D is electrically connected to the power supply terminal 31 on a GND side; and a source electrode S is connected to a GND or a cathode of the circuit element 25. Upon supply of the voltage from the battery, the field effect transistor 25*d*1 turns on, and the GND or the cathode of the circuit element 25 is electrically connected to the ground of the vehicle such as the chassis.

In other words, in the case where the field effect transistor 25*d*1 is an n-channel field effect transistor, the gate electrode G of the n-channel field effect transistor is electrically connected between a positive side of the DC power supply and the anode side of the light emitting element 22. The drain electrode D of the n-channel field effect transistor is electrically connected to a negative side of the DC power supply and a varistor 25*d*2 to be described later. The source electrode S of the n-channel field effect transistor is electrically connected to another circuit element 25 other than the varistor 25*d*2 provided at the light emitting circuit 20*a*. In other words, the source electrode S of the n-channel field effect transistor is not electrically connected to the varistor 25*d*2.

Upon application of a negative surge to the field effect transistor 25*d*1 (n-channel field effect transistor), the field effect transistor 25*d*1 turns into an off state. Thus, a reverse voltage is not applied to the light emitting circuit 20*a*, so the light emitting circuit 20*a* can be protected.

In the case where the field effect transistor 25*d*1 is a p-channel field effect transistor, a gate electrode G is electrically connected to the ground of the vehicle such as the chassis of the vehicle body, a drain electrode D is electrically connected to the power supply terminal 31 on the Vin side, and a source electrode S is electrically connected to the VIN terminal of the control element 25*a*.

Upon application of a negative surge to the field effect transistor 25*d*1 (p-channel field effect transistor), the field effect transistor 25*d*1 turns into an off state. Thus, a reverse voltage is not applied to the light emitting circuit 20*a*, so the light emitting circuit 20*a* can be protected.

As described above, by providing the field effect transistor 25*d*1, application of a negative surge to the control element 25*a* and the light emitting element 22 can be suppressed.

In addition, since the voltage drop of the field effect transistor 25*d*1 is smaller compared to a diode, it becomes easier to configure the total luminous flux to be equal to or greater than the specified value even in the case where the voltage applied to the vehicle lighting device 1 becomes low.

The field effect transistor 25*d*1 may be any of an n-channel field effect transistor and a p-channel field effect transistor. However, if the field effect transistor 25*d*1 is an n-channel field effect transistor, the field effect transistor 25*d*1 does not turn on when a negative surge is applied. Thus, even in the case where the field effect transistor 25*d*1 and the second protective element 25*e* are connected in parallel, application of a negative surge to the second protective element 25*e* can be suppressed.

In addition, compared to the p-channel field effect transistor, the n-channel field effect transistor also has advantages of being excellent in switching properties, exhibiting high availability, and incurring low cost.

Herein, in the case of the vehicle lighting device 1, a high withstand voltage (e.g., about −600 V) against a negative surge voltage (reverse direction voltage) is required. Since a field effect transistor 25*d*1 having a high withstand voltage becomes larger in size, it is difficult to simply provide the field effect transistor 25*d*1 at the vehicle lighting device 1 for which miniaturization is required.

In addition, with the withstand voltage becoming about 300 V to 400 V, an ON-resistance of the field effect transistor **25*d*1 increases significantly. Thus, if the field effect transistor 25*d*1 is configured to have a high withstand voltage, the voltage drop described above increases, and in the case where the voltage applied to the vehicle lighting device 1** becomes low, there is a risk that the total luminous flux may become less than the specified value.

Thus, as shown in FIG. 3, the first protective element **25*d* is provided with a varistor 25*d*2 connected in parallel with the field effect transistor 25*d*1. With the varistor 25*d*2 provided, it is possible to configure the negative surge voltage applied to the field effect transistor 25*d*1 to be equal to or less than a limiting voltage of the varistor. Accordingly, since it becomes possible to select a field effect transistor 25*d*1 with a low withstand voltage, a small-sized field effect transistor 25*d*1 can be selected to achieve miniaturization of the vehicle lighting device 1**, and the voltage drop described above can be suppressed.

For example, the withstand voltage of the field effect transistor **25*d*1 may be configured to be 100 V or less. In this case, a varistor voltage of the varistor 25*d*2 may be configured such that in the case where a negative surge voltage (reverse direction voltage) of about −600 V is applied to the vehicle lighting device 1, a negative surge voltage (reverse direction voltage) exceeding the withstand voltage of the field effect transistor 25*d*1 is not applied to the field effect transistor 25*d*1**.

Although the case where a negative surge is applied to the vehicle lighting device 1 has been described above, there may also be cases where a positive surge is applied to the vehicle lighting device 1. For example, upon sudden turn-off of a high-power load such as an air conditioning apparatus, a battery voltage may overshoot. Upon application of such a positive surge to the control element **25*a* or the light emitting element 22, there is a risk that the vehicle lighting device 1 may fail or the function of the vehicle lighting device 1** may deteriorate.

Thus, the light emitting circuit **20*a* is provided with the second protective element 25*e*. The second protective element 25*e* may be connected in parallel with the first protective element 25*d*. The second protective element 25*e* may be, for example, a Zener diode. In this case, the second protective element 25*e* may be, for example, a surge absorption diode (transient voltage suppressor (TVS)) or the like. A cathode side of the Zener diode is electrically connected between the power supply terminal 31 on the Vin side and the VIN terminal of the control element 25*a***. An anode side of the Zener diode is electrically connected to the ground of the vehicle such as the chassis of the vehicle body.

In other words, the cathode side of the Zener diode is electrically connected to the positive side of the DC power supply. The anode side of the Zener diode is electrically connected to the source electrode S of the field effect transistor **25*d*1**.

With the second protective element **25*e* provided, since the positive surge voltage can be reduced to a clamp voltage of the Zener diode, application of an excessively large voltage to the control element 25*a*, the first protective element 25*d*, and the light emitting element 22** can be suppressed.

In addition, since the withstand voltage of the light emitting element 22 is low, if a part of the positive surge is applied to the light emitting element 22 via the control element **25*a*, there is a risk that the light emitting element 22 may fail. Thus, a third protective element 25*f* may also be further provided to be connected in parallel with the light emitting element 22. The third protective element 25*f* may be, for example, similar to the second protective element 25*e*. In other words, the third protective element 25*f* may be a Zener diode. In this case, the third protective element 25*f* may be, for example, a surge absorption diode or the like. A cathode side of the Zener diode may be connected in parallel with the anode side of the light emitting element 22**. An anode side of the Zener diode is electrically connected to the ground of the vehicle such as the chassis of the vehicle body.

(Vehicle Lamp)

In an embodiment of the disclosure, a vehicle lamp 100 including the vehicle lighting device 1 may be provided. The description related to the vehicle lighting device 1 described above and modification examples of the vehicle lighting device 1 (e.g., those in which a person skilled in the art has performed appropriate additions, deletions, or design changes on the constituent elements and which include the features of the disclosure) may all be applied to the vehicle lamp 100.

Hereinafter, as an example, a case where the vehicle lamp 100 is a front combination light provided in an automobile will be described. However, the vehicle lamp 100 is not limited to a front combination light provided in an automobile. The vehicle lamp 100 may be any vehicle lamp provided in an automobile, a railway vehicle, etc.

Figure 4:
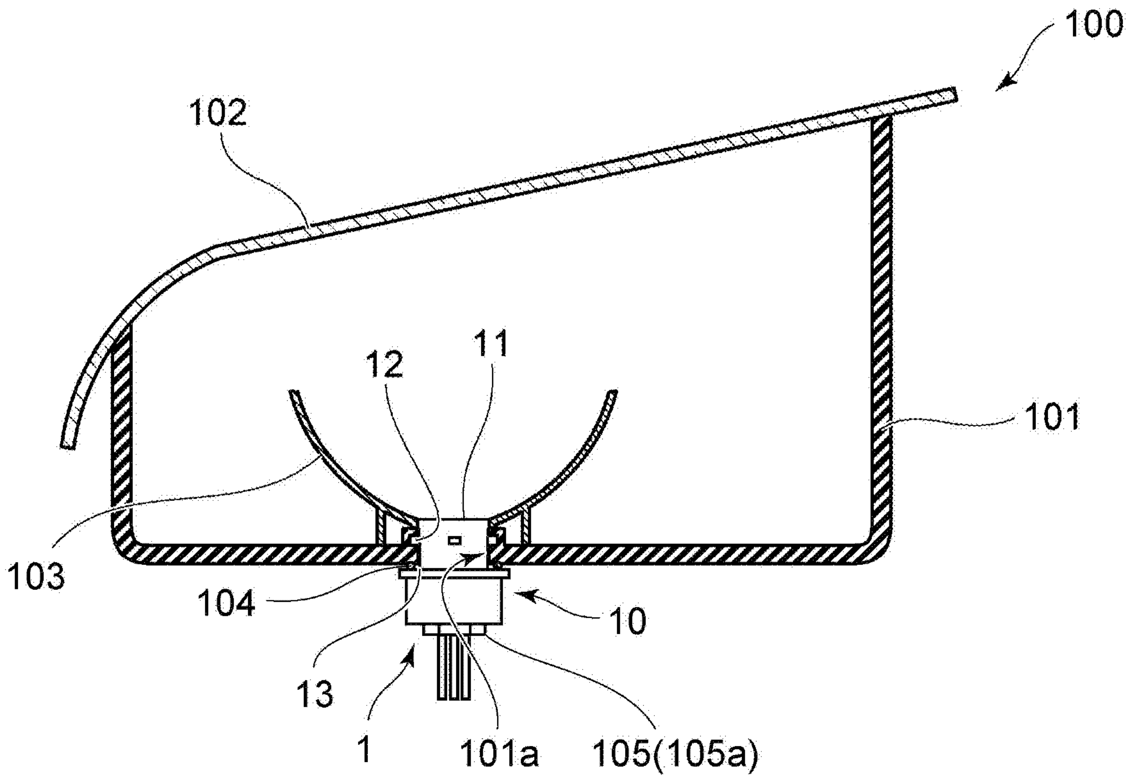
FIG. 4 is a schematic partial cross-sectional view for illustrating a vehicle lamp.

FIG. 4 is a schematic partial cross-sectional view for illustrating the vehicle lamp 100. As shown in FIG. 4, the vehicle lamp 100 includes, for example, the vehicle lighting device 1, a housing 101, a cover 102, an optical element 103, a seal member 104, and a connector 105.

The vehicle lighting device 1 is attached to the housing 101. The housing 101 holds the mounting part 11. The housing 101 is in a box shape opened on one end side. The housing 101 is formed from, for example, a resin that does not transmit light. A bottom surface of the housing 101 is provided with an attachment hole **101*a* into which a portion of the mounting part 11 provided with the bayonet 12 is inserted. A circumferential edge of the attachment hole 101*a* is provided with a recess into which the bayonet 12 provided at the mounting part 11 is inserted. Although the case where the attachment hole 101*a* is directly provided at the housing 101 has been illustrated herein, an attachment member having the attachment hole 101*a* may also be provided at the housing 101**.

When attaching the vehicle lighting device 1 to the vehicle lamp 100, a portion of the mounting part 11 provided with the bayonet 12 is inserted into the attachment hole **101*a*, and the vehicle lighting device 1 is rotated. As a result, for example, the bayonet 12 is held to a fitting part provided at the circumferential edge of the attachment hole 101*a***. Such an attachment method is referred to as a twist lock.

The cover 102 is provided to close the opening of the housing 101. The cover 102 is formed from a light-transmitting resin or the like. The cover 102 may also serve a function of a lens or the like.

Light emitted from the vehicle lighting device 1 is incident on the optical element 103. The optical element 103 performs reflection, diffusion, light guiding, light focusing of the light emitted from the vehicle lighting device 1, formation of the light into a predetermined light distribution pattern, etc. For example, the optical element 103 illustrated in FIG. 4 is a reflector. In this case, the optical element 103 reflects the light emitted from the vehicle lighting device 1 to form a predetermined light distribution pattern.

The seal member 104 is provided between the flange 13 and the housing 101. The seal member 104 is in an annular shape and is formed from a material having elasticity such as rubber or silicone resin.

With the vehicle lighting device 1 attached to the vehicle lamp 100, the seal member 104 is sandwiched between the flange 13 and the housing 101. Thus, an internal space of the housing 101 can be sealed by the seal member 104. In addition, due to an elastic force of the seal member 104, the bayonet 12 is pressed against the housing 101. Accordingly, detachment of the vehicle lighting device 1 from the housing 101 can be suppressed.

The connector 105 is fitted to the end parts of the multiple power supply terminals 31 exposed inside the connector holder 15. A lighting circuit or the like is electrically connected to the connector 105. Thus, by fitting the connector 105 to the end parts of the multiple power supply terminals 31, the lighting circuit or the like can be electrically connected to the light emitting element 22.

In addition, the connector 105 is provided with the seal member 105*a*. When the connector 105 having the seal member 105*a* is inserted into the connector holder 15, the inside of the connector holder 15 is sealed to be watertight.

Although the embodiments of the disclosure have been illustrated above, these embodiments are presented as examples and are not intended to limit the scope of the disclosure. These novel embodiments may be implemented in various other forms, and various omissions, replacements, changes, etc., may be made within a range that does not deviate from the gist of the disclosure. These embodiments and their modification examples are included within the scope and gist of the disclosure and are included within the scope of the disclosure described in claims and their equivalents. Further, each of the embodiments described above may be combined with each other.

The following shows supplementary notes associated with the embodiments described above.

Supplementary Note 1

A light emitting module including:

at least one light emitting element;

a field effect transistor electrically connected between an anode side and a cathode side of the light emitting element and a DC power supply; and a varistor connected in parallel with the field effect transistor.

Supplementary Note 2

The light emitting module according to Supplementary Note 1, in which the field effect transistor is an n-channel field effect transistor, a gate electrode of the n-channel field effect transistor is electrically connected between a positive side of the DC power supply and the anode side of the light emitting element via a resistor, and is electrically connected to a source electrode of the n-channel field effect transistor via a resistor, a drain electrode of the n-channel field effect transistor is electrically connected to a negative side of the DC power supply and the varistor, and the source electrode of the n-channel field effect transistor is not electrically connected to the varistor.

Supplementary Note 3

The light emitting module according to Supplementary Note 1 or 2, further including a Zener diode connected in parallel with the field effect transistor, in which a cathode side of the Zener diode is electrically connected to a positive side of the DC power supply, and an anode side of the Zener diode is electrically connected to the source electrode of the field effect transistor.

Supplementary Note 4

The light emitting module according to any one of Supplementary Notes 1 to 3, further including a control element electrically connected between the anode side of a plurality of the light emitting elements connected in series and the field effect transistor, in which the control element is capable of performing at least one of temperature derating, and switching of a quantity of the light emitting elements to be illuminated according to a voltage applied to the light emitting module.

Supplementary Note 5

A vehicle lighting device including:

the light emitting module according to any one of Supplementary Notes 1 to 4; and a socket at which the light emitting module is provided.

Supplementary Note 6

A vehicle lamp including:

the vehicle lighting device according to Supplementary Note 5; and a housing to which the vehicle lighting device is attached.

What is claimed is:

1. A light emitting module comprising:

at least one light emitting element;

a field effect transistor electrically connected between an anode side and a cathode side of the light emitting element and a DC power supply; and a varistor connected in parallel with the field effect transistor, wherein the field effect transistor is an n-channel field effect transistor, a gate electrode of the n-channel field effect transistor is electrically connected between a positive side of the DC power supply and the anode side of the light emitting element via a resistor, and is electrically connected to a source electrode of the n-channel field effect transistor via a resistor, a drain electrode of the n-channel field effect transistor is electrically connected to a negative side of the DC power supply and the varistor, and the source electrode of the n-channel field effect transistor is not electrically connected to the varistor.

2. The light emitting module according to claim 1, further comprising a Zener diode connected in parallel with the field effect transistor, wherein a cathode side of the Zener diode is electrically connected to the positive side of the DC power supply, and an anode side of the Zener diode is electrically connected to the source electrode of the field effect transistor.

3. A light emitting module comprising:

at least one light emitting element;

a field effect transistor electrically connected between an anode side and a cathode side of the light emitting element and a DC power supply;

a varistor connected in parallel with the field effect transistor; and a control element electrically connected between the anode side of a plurality of the light emitting elements connected in series and the field effect transistor, wherein the control element is capable of performing at least one of temperature derating, and switching of a quantity of the light emitting elements to be illuminated according to a voltage applied to the light emitting module.

4. A vehicle lighting device comprising:

the light emitting module according to claim 1; and a socket at which the light emitting module is provided.

5. A vehicle lamp comprising:

the vehicle lighting device according to claim 4; and a housing to which the vehicle lighting device is attached.

6. A vehicle lighting device comprising:

the light emitting module according to claim 2; and a socket at which the light emitting module is provided.

7. A vehicle lamp comprising:

the vehicle lighting device according to claim 6; and a housing to which the vehicle lighting device is attached.

8. A vehicle lighting device comprising:

the light emitting module according to claim 3; and a socket at which the light emitting module is provided.

9. A vehicle lamp comprising:

the vehicle lighting device according to claim 8; and a housing to which the vehicle lighting device is attached.

* * * * *